United States Patent [19]

Lundberg

[11] Patent Number: 4,463,168

[45] Date of Patent: Jul. 31, 1984

[54] POLYCAPROLACTONE POLYMERS

[75] Inventor: Robert D. Lundberg, Bridgewater, N.J.

[73] Assignee: Exxon Research and Engineering Co., Florham Park, N.J.

[21] Appl. No.: 565,104

[22] Filed: Dec. 23, 1983

Related U.S. Application Data

[63] Continuation-in-part of Ser. No. 332,813, Dec. 21, 1981, Pat. No. 4,379,914.

[51] Int. Cl.³ .............................................. C08G 63/08
[52] U.S. Cl. ............................ 528/355; 260/239 BF; 544/162; 544/164; 546/122; 546/190; 546/309; 546/334; 548/568
[58] Field of Search ............................... 528/355, 354; 260/239 BF; 544/162, 164; 546/122, 190, 309, 334; 548/568

[56] References Cited

U.S. PATENT DOCUMENTS 4,379,914 4/1983 Lundberg ............................ 528/354

Primary Examiner—Earl A. Nielsen
Attorney, Agent, or Firm—Richard E. Nanfeldt

[57] ABSTRACT

The instant invention relates to a process for the formation of polylactone polymers which are terminated on one end by a tertiary amine group, and on the other end by a hydroxyl group. An ε-caprolactone is reacted with an aromatic organic amine in the presence of a catalyst.

9 Claims, No Drawings

POLYCAPROLACTONE POLYMERS

CROSS REFERENCE TO RELATED APPLICATIONS

This application is a continuation-in-part application of U.S. Ser. No. 332,813, filed Dec. 21, 1981, now U.S. Pat. No. 4,379,914, issued Apr. 12, 1983.

FIELD OF THE INVENTION

The instant invention relates to a process for the formation of polylactone polymers which are terminated on one end by a tertiary amine group and on the other end by a hydroxyl group. An $\epsilon$E-caprolactone is reacted with a diamine in the presence of a catalyst, wherein one of the amine groups of the diamine is a tertiary amine and the other amine group is primary or secondary.

BACKGROUND OF THE INVENTION

It has been known that polymers of $\epsilon$-caprolactone can be readily prepared via reactions of the $\epsilon$-caprolactone monomer with a hydroxyl or amine initiator which can lead to a hydroxyl terminated polymer, as shown by the equation:

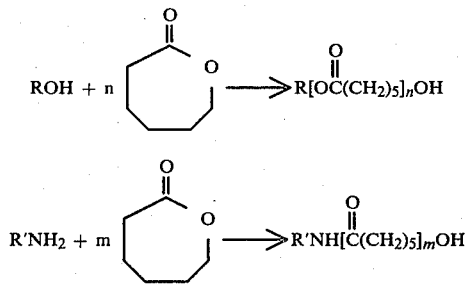

Similar types of reactions can lead to a variety of different molecular weight polymers; however generally the most desirable polymers have number average molecular weights as measured by GPC of about 1000 to about 5000. The above synthesis is a very desirable one because the functionality is preserved extremely well, and one achieves in the product essentially all the hydroxyl groups that are added prior to the polymerization.

The use of caprolactone as a polymerizing monomer to obtain very high molecular weight polymers is also well-known. In these cases, molecular weights on the order of 50 to 100,000, are readily obtained by the use of certain types of catalysts. In those polymerizations, initiators are normally not employed or employed at very low levels. Typically, in any of these two aforementioned polymerization processes, the degree of polymerization is determined by the amount of initiator employed as follows:

$$\text{Degree of Polymerization} = DP = \frac{[\text{Moles of } \epsilon\text{-caprolactone}]}{[\text{Moles of Initiator}]}$$

The polymerization of these lactone monomers including $\epsilon$-lactone yields a hydroxyl terminated polymer. These aforementioned processes do not teach one how to obtain a polymer which is terminated, at least at one end, by an amine group. For example, if an amine such as a primary amine, n-butyl amine, is utilized to initiate $\epsilon$-caprolactone polymerization, a product is obtained which has a hydroxyl group on one end and an amide group on the other. In other words, the reaction always leads to a propagating species which is hydroxyl terminated. If one employs a diamine, essentially the same situation ensues, that is, one gets a propagating species which has a hydroxyl group on each end of the polymer chain. This is desirable for many applications, but it does limit the utility of the caprolactone technology primarily to hydroxyl functionality.

The instant invention describes a process which permits the preparation of a new class of polylactones derived from lactone monomers. The process, as described herein, involves the use of amine containing initiators which are amine-containing heterocyclic structures with at least 2 amine groups, where at least one nitrogen atom is contained in a heterocyclic ring as a tertiary amine and a second (or more) nitrogen atom is attached to the ring, and is a primary or secondary amine. The resulting polymeric products have tertiary amine-containing heterocyclic ring at one end as shown in the following equation:

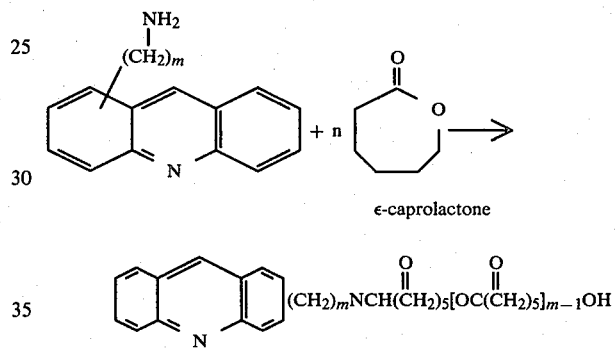

wherein n=1 to 500; m=0 to 20. Other initiators are also contemplated in this invention. The exact position where the primary amine terminated-aliphatic chain is attached to the heterocyclic ring is not important; the structures above are representative.

SUMMARY OF THE INVENTION

The instant invention relates to a process for the formation of polylactones which are terminated on one end by a tertiary amine-containing heterocyclic ring group, and on the other end by a hydroxyl group. An $\epsilon$-caprolactone is reacted with an initiator containing at least 2 amine groups in the presence of a catalyst, leading to a poly $\epsilon$-caprolactone having a nitrogen-containing heterocyclic ring at one end. The products of this instant invention can be used in a number of different applications. For example, one of the primary objectives of obtaining these materials is to use them to neutralized certain sulfonic acid-containing polymers, for example, lightly sulfonated polystyrene or fully sulfonated polystyrene, available as a sulfonic acid, moieties. These sulfonic acid polymers can be neutralized with these materials to give an amine-neutralized, sulfonated derivative which has a variety of different applications such as viscosity modifiers for oils. Similarly a sulfonated EPDM can be employed, in combination of these materials, to give a new variety of amine-neutralized, sulfonated elastomeric polymers.

Additionally, these materials can be combined with other low molecular weight sulfonic acid moieties, such as dodecyl benzene sulfonic acid, to give an interesting new class of surfactants which contain ester groups, hydroxyl groups and amine-neutralized sulfonate groups.

GENERAL DESCRIPTION OF THE INVENTION

The instant invention generally relates to a unique and novel class of new water insoluble polycaprolactone compounds which are useful in the art of neutralizing organic sulfonic acids or polymeric sulfonic acids. The polyester compounds of the instant invention are terminated at one end by a group with a tertiary amine containing heterocyclic ring.

These polyesters are formed by the reaction of an ε-caprolactone with an aromatic organic amine in the presence of a catalyst. The anhydrous ε-caprolactone and the aromatic organic amine, in the presence of the catalyst are reacted in a reaction vessel in the absence of a solvent at a temperature of about 50° to about 200° C., more preferably about 75° to about 180° C., and most preferably about 90° to about 160° C. for a sufficient period of time to effect polymerization. Optionally, a solvent for the monomer and/or polymer can be employed to control viscosity and/or reaction rates.

The reaction of the ε-caprolactone with the diamine which has one primary or secondary amine and at least one amine group which is contained in a cyclic, heterocyclic, unsaturated or aromaticing structure can be generally depicted by the equation:

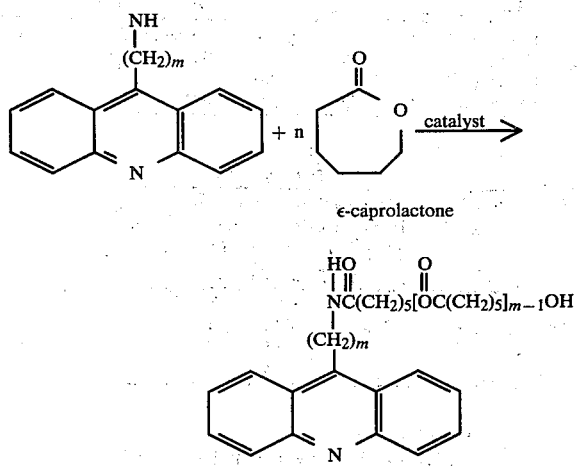

ε-caprolactone

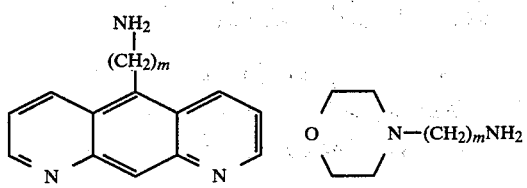

wherein n=1 to 500 and m=0 to 20.

Typical, but non-limiting examples of other useful aromatic or heterocyclic organic amines are:

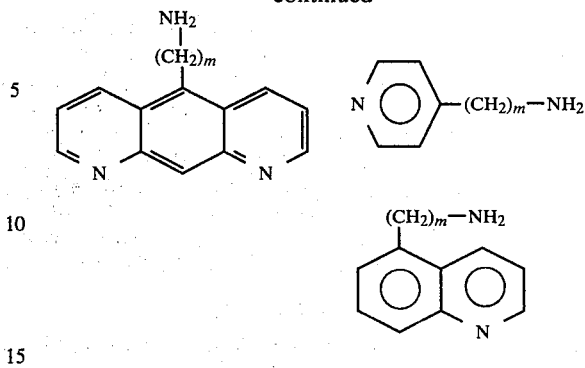

Where m=0 to 20. The specific location of the substituents on the heterocyclic rings is not critical; these structures are representative.

Catalysts useful in the promotion of the above-identified reaction are selected from the group consisting of stannous octanoate, stannous hexanoate, stannous oxalate, tetrabutyl titanate, a variety of metal organic based catalysts, acid catalysts and amine catalysts, as described on page 266, and forward in a book chapter authored by R. D. Lundberg and E. F. Cox entitled, "*Kinetics and Mechanisms of Polymerization: Ring Opening Polymerization*"; edited by Frisch and Reegen, published by Marcelt Dekker in 1969, wherein stannous octanoate is an especially preferred catalyst. The catalyst is added to the reaction mixture at a concentration level of about 100 to about 10,000 parts of catalysts per one million parts of ε-caprolactone.

The resultant polycaprolactone polymer has an $\overline{M}_n$ as measured by GPC of about 200 to about 50,000, more preferably about 500 to about 40,000, and most preferably about 700 to about 300,000 and a melting point from below room temperature to about 55° C., more preferably about 20° to about 52° C., and most preferably about 20° to about 50° C. Copolymers with other lactones are also anticipated as long as ε-caprolactone is the major component.

DETAILED DESCRIPTION OF THE INVENTION

The advantages of the polymers of the instant invention can be more readily appreciated by reference to the following examples and tables.

EXAMPLE 1

A sample of diamine initiated poly ε-caprolactone was prepared as follows: 97.1 ml of distilled ε-caprolactone was placed in a reaction vessel and to the lactone was added 42.1 grams of N-amino propyl morpholine (NAPM) and 0.25 ml stannous octoate. This combination of diamine initiator and lactone were designed to give a polymer of about 500 molecular weight. The reactants were stirred and heated for about 2 hours while gradually raising the temperature to 150° C. The polymerization reaction was continued at 150°–153° C. for an additional 1 hour and 20 minutes. It was noted that the clear solution changed color to orange and then to reddish black and the reaction mixture became thicker. The reaction mixture was poured into a Teflon coated aluminum container and cooled obtaining a thick dark liquor. The analytical data for this sample are shown in Table I.

EXAMPLE 2

In a similar manner to Example 1, a poly ε-caprolactone with a molecular weight of 200 was prepared by reacting 97.1 ml distilled ε-caprolactone, 7.9 g N-amino propyl morpholine (NAPM) and 0.25 ml stannous octoate. Reaction temperature was raised to 150° C. over a period of about 2 hours and held at 150°-154° C. for 1 and ½ hours. A change in color to dark red-black was noted. The reaction mixture became very thick. Coloring of the reaction mixture produced a hard brown waxy solid. Analytical data are shown in Table I.

EXAMPLE 3

Using the procedure of Example 1, a poly ε-caprolactone of molecular weight 4000 was prepared by reacting under similar conditions, 97.1 ml distilled ε-caprolactone, 3.73 g N-amino propyl morpholine (NAPM) and 0.25 g stannous ortoate. Color developed to yellow-orange and reaction mixture thickened. Cooling after the same reaction period produced a hard white waxy solid. Analytical data are shown in Table I.

EXAMPLE 4

Using the same procedure of Example 1, a poly ε-caprolactone of molecular weight 8000 was prepared by reacting under similar conditions 97.1 ml ε-caprolactone, 1.88 g N-amino propyl morpholine (NAPM) and 0.25 g stannous octonate. A yellow-orange color and thickening of the reaction mixture was noted. After the same reaction period, the mixture was cooled producing a hard white wax solid. Analytical data are shown in Table I.

TABLE I

NITROGEN ANALYZERS AND REDUCED VISCOSITY CHARACTERIZATION OF POLYMER SAMPLES: (XYLENE)

| Sample | Target Molecular Weight | % N | Reduced Viscosity of 2% Solution Xylene, 25° C. |
|---|---|---|---|
| Example 1 | 500 | 5.45 | Not completely soluble |
| Example 2 | 2,000 | 1.33 | 0.096 |
| Example 3 | 4,000 | 0.70 | 0.185 |
| Example 4 | 8,000 | 0.33 | 0.305 |

These experiments clearly demonstrate that a polymer of ε-caprolactone can be obtained employing the NAPM initiator. Furthermore, the molecular weight obtained with this initiator increases as the amount of initiator is decreased as shown by the reduced viscosity measurements of Table I and also as supported by the nitrogen analysis results in Table I. These experiments clearly demonstrate how this family of initiators can be employed to control polymer molecular weight to any desired degree.

Neutralization of Sulfo-polystyrene acid with poly-ε-caprolactone-N-amino propyl morpholine.

A sulfonated polystyrene containing 3.37 mol % sulfonic acid was neutralized using the poly-ε-caprolactone-N-amino propyl morpholine additives prepared in Examples 1–4 as described in the following examples:

EXAMPLE 5

In a 500 ml reaction vessel, 25 g of 3.37 mol % sulfopolystyrene was dissolved in 250 ml of dichloroethane. A solution of 4.22 g poly-ε-caprolactone-N-amino propyl morpholine, 500 molecular weight (Example 1) in 25 ml dichloroethane was added and the reactants stirred at ambient temperature for four hours. The product was recovered by precipitating and washing with excess hexane, air drying in a hood and finally vacuum oven drying at 60° C. for one day.

EXAMPLE 6

In a 500 ml reaction vessel charged 25 g of 3.37 mol % sulfo-polystyrene, 16.85 g poly-ε-caprolactone-N-amino propyl morpholine, 2000 molecular weight (Example 2) and 275 ml dichloroethane. The reactants were stirred at ambient temperature to dissolve and stirring continued for four hours. Product was recovered as described in Example 5.

EXAMPLE 7

In a 500 ml reaction vessel charges 15 g of 3.37 mol % sulfo-polystyrene, 20.22 g poly-ε-caprolactone-N-amino propyl morpholine, 4000 molecular weight (Example 3) and 250 ml dichloroethane. The reactants were stirred at ambient temperature to dissolve and stirring continued for 4 hours. Product was recovered as described in Example 5.

EXAMPLE 8

In a 500 ml reaction vessel charges 10 g of 3.37 mol % sulfo-polystyrene, 26.36 g poly-ε-caprolactone-N-amino propyl morpholine, 8000 molecular weight (Example 4) and 250 ml dichloroethane. The reactants were stirred at ambient temperature to dissolve and stirring continued for 4 hours. Product was recovered as described in Example 5.

TABLE II

Nitrogen Analysis and Reduced Viscosity vs. Concentration In Xylene Sulfo-Polystyrene-Poly-ε-caprolactone-N—amino propyl morpholine of Examples 5–8.

| | | Reduced Viscosity at 25° C. | | | | |
|---|---|---|---|---|---|---|
| Sample | % N | 5% Conc. | 2% Conc. | 1% Conc. | 0.5% Conc. | 0.25% Conc. |
| Example 5 | 0.77 | — | (Polymer precipitated upon dilution) | | | |
| Example 6 | 0.54 | 1.90 | 0.763 | 0.566 | 0.473 | 0.497 |
| Example 7 | 0.37 | 2.23 | 0.961 | 0.714 | 0.591 | 0.512 |
| Example 8 | 0.31 | 2.78 | 1.22 | 0.891 | 0.702 | 0.597 |

TABLE III

Viscosity vs. Temperature Of 5% Concentration Solutions Of Sulfo-Polystyrene-Poly-ε-caprolactone-N—Amino Propyl Morpholines Of Examples 5–8.

| Sample | 0° C. | 25° C. | 50° C. | 75° C. | 100° C. |
|---|---|---|---|---|---|
| Example 5 | (GELS Out) | 23.6 | 9.9 | 4.91 | 3.14 |
| Example 6 | 11.8 | 6.34 | 4.25 | 3.20 | 2.50 |
| Example 7 | 12.2 | 7.25 | 5.07 | 3.85 | 3.05 |
| Example 8 | 11.4 | 8.94 | 6.19 | 4.63 | 3.55 |

What is claimed is:

1. A polycaprolactone formed by the reaction of an ε-caprolactone with an amine compound having the formula selected from the group consisting of:

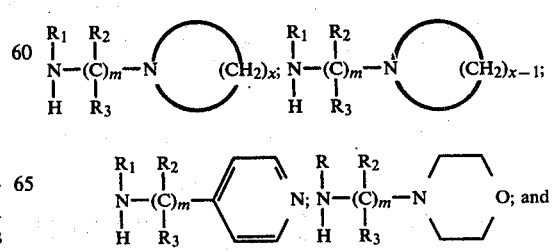

-continued

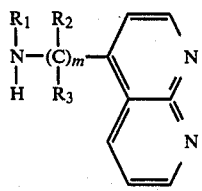

wherein $R_1$, $R_2$, and $R_3$ are selected from the group consisting of the hydrogen, alkyl groups having about 1 to about 10 carbon atoms and aryl groups having about 1 to about 10 carbon atoms, x is an integer of from 4 to 7 and m is an integer of from 0 to 20.

2. A polycaprolactone polymer according to claim 1, wherein said polycaprolactone polymer has a DP of about 2 to about 50.

3. A polycaprolactone polymer formed by the reaction of an ε-caprolactone with a diamine, wherein one of the amine groups of said diamine is a primary or secondary amine and the other amine groups is contained in a cyclic, heterocyclic, unsaturated or aromatic ring structure.

4. A polycaprolactone polymer according to claim 3 formed by the reaction of an ε-caprolactone with a diamine, wherein said polycaprolactone polymer has a DP of about 2 to about 500.

5. A polycaprolactone polymer formed by the reaction of an ε-caprolactone with a compound containing at least two amine groups, wherein one of said amine groups is a primary or secondary amine and the other amine or amine groups are contained in a cyclic, heterocyclic, unsaturated or an aromatic ring structure.

6. A polycaprolactone polymer formed by the reaction of an ε-caprolactone with a compound containing at least two amine groups, wherein said polycaprolactone polymer has a DP of about 2 to about 500.

7. A polycaprolactone polymer formed from the reaction of an ε-caprolactone and an amine compound having the formula:

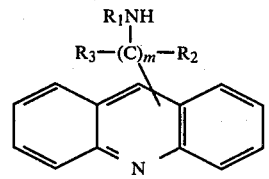

wherein $R_1$, $R_2$, and $R_3$ are selected from the group consisting of hydrogen, alkyl groups having about 1 to about 10 carbon atoms and aryl groups having about 1 to about 10 carbon atoms and m is an integer of from 0 to 20.

8. A polycaprolactone polymer according to claim 7, wherein said polycaprolactone polymer has a DP of about 2 to about 50.

9. A poly lactone formed by the reaction of ε-caprolactone and a substituted 6 or 7 membered lactone where ε-caprolactone comprises at least 50% of the composition, wherein the monomers are polymerized by the reaction with a diamine, wherein one of the amine groups of said diamine is a primary or secondary amine and the other amine is a tertiary amine or is contained in a cyclic, heterocyclic, unsaturated or aromatic ring structure.

* * * * *